United States Patent [19]
Kassel

[11] 3,811,841
[45] May 21, 1974

[54] GATING FLOW CELL STRUCTURE FOR CONTINUOUS-FLOW ANALYSIS SYSTEMS

[75] Inventor: Aaron Kassel, Tarrytown, N.Y.

[73] Assignee: Technicon Instruments Corporation, Tarrytown, N.Y.

[22] Filed: Aug. 9, 1972

[21] Appl. No.: 279,149

[52] U.S. Cl. .......................... 23/253 R, 324/65 R
[51] Int. Cl. ...................... G01n 27/10, G01n 33/16
[58] Field of Search ..................... 23/230, 253, 259; 324/71 R, 65 R, 65 B; 250/218

[56] References Cited
UNITED STATES PATENTS

| | | | |
|---|---|---|---|
| 3,165,693 | 1/1965 | Isreeli et al. | 23/253 X |
| 3,320,149 | 5/1967 | Isreeli | 23/253 X |
| 3,306,229 | 2/1967 | Smythe | 23/253 UX |
| 3,531,252 | 9/1970 | Rivers | 23/253 X |
| 3,600,953 | 8/1971 | Isreeli | 23/253 X |

Primary Examiner—Morris O. Wolk
Assistant Examiner—R. E. Serwin
Attorney, Agent, or Firm—S. P. Tedesco; S. E. Rockwell

[57] ABSTRACT

A flow cell structure having a sight passageway for analyzing a series of liquid samples separated by a segmentizing medium, e.g. air or other inert gas, includes at least three electrodes in electrical contact with the segmented sample stream passing therealong. The electrodes are disposed with respect to the sight passageway and in a ratio system, so as to indicate the presence of segmentizing medium in the sight passageway and deactivate the recorder.

11 Claims, 5 Drawing Figures

GATING FLOW CELL STRUCTURE FOR CONTINUOUS-FLOW ANALYSIS SYSTEMS

BACKGROUND OF THE INVENTION

1. Field of the Invention

This invention relates to a novel flow cell structure for use in continuous-flow analysis and, more particularly, to a flow cell structure operative to detect the passage of segmentizing medium or other foreign matter through the sight passageway thereof, so as to effect appropriate control.

2. Description of the Prior Art

Significant advances have been made in automated continuous-flow analysis. Automated apparatus for performing continuous-flow wet-chemistry analysis was first described in U.S. Pat. No. 2,797,149, issued to L. T. Skeggs on June 25, 1959. In such systems, a liquid stream comprising a seriatum flow of unique liquid samples, successive samples being spaced apart by inert gas segments, is flowed along a conduit system and reacted by a continuous flow of reagent and otherwise suitable treatment with respect to a particular constituent, so as to produce a color reaction. The optical density of such color reaction, at a particular wavelength, bears a predetermined relationship to the content of the particular constituent in the original liquid sample. The reacted liquid samples, still in a continuous stream are directed through the sight passageway of a flow cell structure for colorimetric analysis. To this end, a light beam of known intensity and wavelength is passed along the sight passageway and through the treated liquid sample flowing therein, the reduced intensity of passed light beam providing an indication of the concentration of the particular constituent under analysis.

Generally, the liquid samples in continuous-flow analysis systems are separated by inert gas segments, e.g., air, nitrogen, etc. These inter-sample gas segments, or bubbles, serve a very essential function of the overall system, as described in the above-described Skeggs patent. It is presently appreciated that such bubbles, not only serve to maintain the integrity of the successive samples, but, also, scrub the interior surface walls of the conduit system, so as to substantially eliminate contamination between successive liquid samples in the flowing stream. Generally, these gas segments are of sufficient volume to occlude the conduit, whereby the gas molecules continuously bombard, so as to scrub, the interior surfaces of the conduit to dislodge residues of a preceding sample trapped within macroscopic crevices in such surfaces, which could contaminate a next passing liquid sample. Additionally, each liquid sample is further subdivided by smaller-volume gas segments, i.e., intra-sample segments, so as to facilitate and achieve a more accurate proportioning between the sample and reagent liquids, for example, as described in U.S. Pat. No. 3,306,229, issued to William J. Smythe on Feb. 28, 1967 and assigned to a common assignee.

During the early stages of development of continuous-flow analysis systems, it was generally preferred not to allow either the inter- or intra-sample gas segments to pass through the sight passageway of the flow cell structure. For many years, the prior art "debubbled" all gas segments in the liquid stream, for example, by venting the conduit system immediately upstream of the flow cell structure. It was believed that the presence of any foreign fluid, whether gas or liquid, would interfere with the analytical process, for example, by causing transients in the analytical signal. This "debubbling" of gas segments continued, notwithstanding the beneficial results of passing gas segments along a conduit, i.e., cleansing of the interior surface walls, was appreciated.

In U.S. Pat. application Ser. No. 369,695, filed in the name of W. J. Smythe on May 25, 1964, it was proposed, inter alia, to pass the segmented liquid sample stream through the flow cell, in avoidance of debubbling, and to deactivate the recorder during passage of each gas segment. However, such operation requires a detection of the ingress and egress of the successive gas segments through the sight passageway of the flow cell. However, by avoiding debubbling a new systems concept resulted, in that, sample integrity was maintained throughout the system. As a direct result, system efficiency was significantly increased, as indicated by a substantial increase in the processing rate and a substantial reduction in the volume of liquid sample required to effect meaningful analysis. Also, as the liquid samples passing through the flow cell were maintained discrete, a steady-state condition, i.e., the presence of a homogeneous or uncontaminated liquid sample in the sight passageway, was rapidly obtained, since intermixing between successive liquid samples passing through the flow cell structure was avoided.

As a result, numerous techniques were developed by detecting the presence or passage of gas bubbles in the sight passageway of the flow cell. For example, an optical method has been described in U.S. Pat. No. 3,480,369, issued to W. J. Smythe et al. on Nov. 25, 1969, for detecting the intersections of the leading and trailing menisci, respectively, of each gas segment with the measuring light beam passing through the sight passageway of the flow cell structure, to deactivate the recorder. Also, a technique for electrically detecting the presence of a gas segment in the sight passageway of the flow cell of a continuous-flow analysis system has been described in "A Bubble-Gating Flow Cell for Continuous-Flow Analysis" by R. L. Habig et al, Clinical Chemistry, Vol. 15, No. 11, 1969, pps. 1045–1055. Such technique identifies the presence of a gas segment in the sight passageway of a flow cell structure by detecting a change in the conductivity of the fluid volume therein. Such flow cell structure includes input and output metallic electrodes upstream and downstream, respectively, and in close proximity to the sight passageway of the flow cell structure. A voltage is applied across the metallic electrodes to measure the conductivity of the fluid volume disposed between such electrodes. A conductivity threshold is set at a level corresponding to the absence of gas segments and the presence of only liquid sample between the electrodes. Therefore, an abrupt drop in the conductivity of the fluid volume will indicate the presence of a gas segment between the electrodes, which can be used to deactivate a recorder in conventional fashion. However, such technique is conductivity-dependent, and the threshold level must be adjusted, according to the conductivity of the liquid samples being analyzed.

OBJECTS OF THE INVENTION

An object of this invention is to provide a bubble-gating flow cell structure useful in continuous-flow analysis systems.

Another object of this invention is to provide a bubble-gating flow cell structure having an operation which is independent of the flow rate and/or conductivity of the fluid volume passing through the sight passageway.

A further object of this invention is to provide a bubble-gating flow cell which is of a relatively simple and inexpensive design, which is reliable in operation, and which may be readily substituted into existing continuous-flow analysis systems.

SUMMARY OF THE INVENTION

In accordance with the preferred embodiment of the invention, the bubble-gating flow cell comprises a tubular sight passageway having a fluid inlet and fluid outlet for passage of a segmented liquid sample stream. A pair of metallic electrodes are placed in close proximity to such fluid inlet and fluid outlet and in continuous contact with the segmented liquid sample stream passing therethrough and through the sight passageway. In addition, a third or center metallic electrode is located between the inlet and outlet electrodes, and in continuous contact with the liquid sample stream. The individual electrodes are interconnected in a bridge-type arrangement, so as to measure the ratio of the conductivity of the fluid volumes between the inlet and center electrode and the outlet and center electrode, respectively. Each liquid sample in the segmented stream is, at least, sufficient to fill the volume of the flow cell structure, between the inlet and outlet electrodes.

Initially, the bridge-type arrangement is balanced while the volume between the input and output electrodes is filled with a medium of single conductivity, e.g., liquid sample or other conducting media. Since the balance is based from the conductivity ratio, it is essentially independent of the respective conductivities of either the gas segments or liquid samples which comprise the segmented liquid sample stream passed through the flow cell structure. The bridge-type arrangement, however, becomes unbalanced whenever this conductivity ratio is varied, for example, by the presence of a gas segment between the input and output electrodes. In the three-electrode arrangement, so far described, a transient condition does exist, whereby the bridge-type arrangement becomes momentarily balanced during passage of a gas segment between the input and output electrodes. Such transient condition can be discriminated by appropriate logic. Any unbalance of the bridge-type arrangement can be utilized to disable the stylus chart recorder.

An additional embodiment of the invention is described which comprises a four-electrode arrangement, wherein, a pair of center electrodes are disposed between the input and output electrodes, and the voltages developed at both center electrodes are initially balanced. The presence of a gas segment anywhere between the input and output electrodes causes, at least, one of the center electrodes to be unbalanced. The unbalancing of at least one of the center electrodes is utilized to inhibit the stylus chart recorder.

DETAILED DESCRIPTION OF THE INVENTION

Figure 1A:
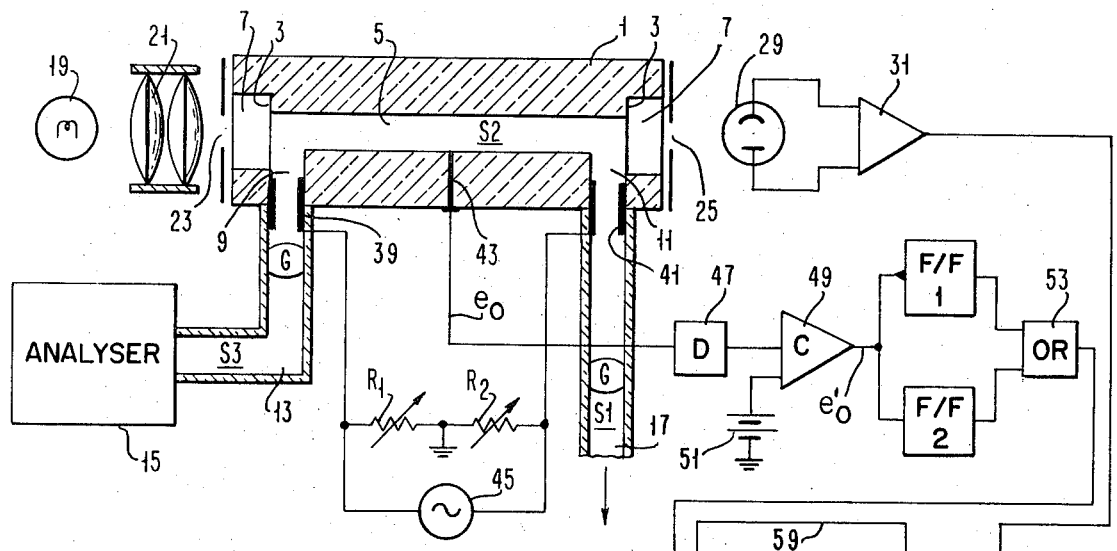
FIG. 1A shows a three-electrode flow cell structure in accordance with the present invention for detecting the passage of a gas segment through the sight passageway thereof.
Figure 1B:
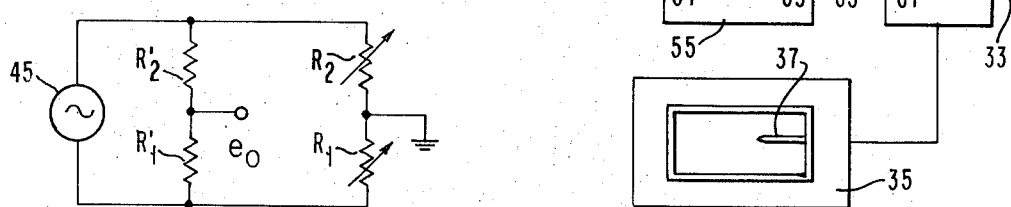
FIG. 1B is a schematic diagram and FIG. 1C is a wave-form diagram, respectively, to facilitate an understanding of the operation of FIG. 1A.

Referring to FIGS. 1A and 1B, the flow cell structure comprises a tubular body 1 having recessed annular shoulders 3 defined in opposite ends thereof. Transparent end windows 7 are received and maintained on shoulders 3, respectively, so as to define the sight passageway 5. Additionally, a fluid inlet passageway 9 and a fluid outlet passageway 11 communicate with passageway 5, in close proximity to end windows 7, respectively. A more detailed structural description of flow cell structures useful in continuous-flow analysis systems may be had by reference, for example, in U.S. Pat. No. 3,583,817, issued to R. E. Rachlis et al. on June 8, 1971 and assigned to a common assignee.

Fluid inlet 9 is connected along a conduit 13 to a sample treatment apparatus 15, for example, of the type described in the above-identified U.S. Pat. No. 2,797,149. As described, the liquid flow along conduit 13 would consist of a seriatum flow of unique liquid samples S1, S2, S3, etc. each spaced apart by gas segments G, the individual liquid samples being treated with respect to a particular constituent to be analyzed. The treatment of the successive liquid samples produces a color reaction in each sample having an optical density at a given wavelength indicative of the concentration of the particular constituent under analysis. The stream of liquid samples S and gas segments G is directed along conduit 13 and fluid inlet 9, through passageway 5, and from fluid outlet 11 along outlet conduit 17 to waste, as indicated by the arrow.

While each liquid sample is flowing along passageway 5, it is analyzed with respect to the particular constituent of interest. To this end, light source 19 is disposed at the left side of the flow cell structure, and aligned along the axis of passageway 5. A condenser lense 21 is interpositioned between light source 21 and end window 7, so as to focus the light axially along passageway 5. Preferably, light apertures 23 and 25 are disposed adjacent the end windows 7, respectively, so as to prevent stray light entering into passageway 5. Accordingly, light from source 19 is passed along passageway 5 and through the treated sample disposed therein, so as to be incident on photodetector 29. Modulation of the intensity of the light beam passing along passageway 5, therefore, is indicated by a change in the voltage signal developed across photodetector 29. Such voltage signal is amplified by amplifier 31 and directed to the input of a track/hold circuit 33 and from track/hold circuit to stylus chart recorder 35. Recorder 35 may be of the type shown, for example, in U.S. Pat. No. 3,031,917, issued to Milton H. Pelavin on May 1, 1962.

Light incident on photodetector 29, while a treated sample fills passageway 5, is equal to the light directed from source 19, less the light absorbed by the liquid sample. The presence of gas segment, or other foreign medium, along passageway 5, however, can cause a very abrupt change in the light intensity incident on photodetector 29 and, hence, a very abrupt traversal of the stylus 37 in recorder 35. However, passage of the gas segments through passageway 5 of a flow cell structure in a continuous-flow system maintains sample integrity and rapidly obtains steady state conditions. Also, as a direct result of maintaining sample integrity, smaller sample volumes can be utilized for analysis, with a corresponding increase in analysis rate.

The present invention, therefore, is particularly directed to detecting the passage of a gas bubble G, or other segmentizing medium, in the sample stream passed along passageway 5 of the flow cell, so as to inhibit recorder 35. To this end, an input electrode 39 and an output electrode 41 are provided, which may be formed as stainless steel tubular nipples fixed in body 1 and interconnecting fluid inlet 9 and conduit 13 and fluid outlet 11 and conduit 17, respectively. Accordingly, input and output electrodes 39 and 41 are in electrical contact with fluids passing into and from passageway 5. Additionally, a center wire electrode 43 is provided through body 1, so as to contact the fluid flowing along passageway 5 and intermediate input and output electrodes 39 and 41, respectively. Although shown as tubular electrodes, electrode 39 and 41 can be formed as wire electrodes, extending through the walls of conduit 13, and conduit 17, respectively, alternatively, each of the electrodes 31, 41 and 43 could be formed as tubular electrodes, the center electrode 43 being disposed immediately adjacent to the fluid inlet 9 or fluid outlet 11.

As illustrated, input and output electrodes 39 and 41 connected across an alternating current source 45 and arranged in parallel with the series arrangement of resistors R1 and R2, one or both of which may be variable. The junction of resistors R1 and R2 is connected to ground. Additionally, center electrode 43 is connected to the control input 67 of the track/hold circuit 33 through appropriate logic circuitry, hereinafter more fully described. Conventionally, track/hold circuit 33 operates to track the voltage signal developed across photodetector 29, as amplified by amplifier 31, and passes the amplified signal to recorder 35. However, while a gas segment is present between input and output electrodes 39 and 41, the track/hold circuit 33 is disabled by such control circuitry, as hereinafter described, to maintain its original signal level and avoid any major abrupt traversals of stylus 37.

As described, the bubble-detection arrangement is insensitive to variations in the conductivity, flow rate, or volume of the liquid sample or gas segments passed through the flow cell structure, since it is responsive only to variations in the ratio of the respective conductivities of the fluid volumes between input and center electrodes 39 and 43 and center and output electrodes 43 and 41. The spacing between the input, center, and output electrodes 39, 43, and 41 is not critical. To initially balance the arrangement, the volume between input and output electrodes 39 and 41 is filled with a sample or other liquid, whereby the conductivity of the fluid in such volume is uniform throughout. At such time, resistors R1 and R2 are adjusted, as necessary, so that the output $e_0$ at center electrode 43 is equal to zero. That is:

$$e_0 = E \sin\omega t \ [R_1'/R_1'+R_2' - R_1/R_1+R_2] = 0$$

where, $R_1'$ and $R_2'$ are the resistances of the fluid volumes between input and center electrodes 39 and 43 and center and output electrodes 43 and 41, respectively. During such balanced condition, the track/hold circuit 33 should be enabled.

During operation, the volume or length of the liquid sample passed through the flow cell should be, at least, sufficient to fill the volume between the input and output electrodes 39 and 41. While this condition exists, the system remains balanced, i.e., $e_0=O$. However, if a gas segment G enters into the conductive path between the input and output electrodes 39 and 41, the system becomes unbalanced, since either the resistance $R1'$ or $R2'$ will be changed, whereby $e_0 \neq 0$. That is:

$$R_1'/R_1'+R_2' \neq R_1/R_1+R_2$$

During such unbalanced condition, track/hold circuit 33 should be disabled, at least, until such time as gas segment G has passed through passageway 5 and downstream of output electrode 41, and passageway 5 is completely filled with a next liquid sample to an analyzed.

However, in the three-electrode structure shown in FIG. 1A, a transient condition occurs during passage of gas segment G along passageway 5, such that the respective resistivities of the fluid volumes between input and center electrodes 39 and 43 and center and output electrodes 43 and 41 are momentarily equal. For example, in the described embodiment, since center electrode 43 is centrally disposed between input and output electrodes 39 and 41, this transient condition would exist when a gas segment G is located immediately over center electrode 43. This transient condition, and the resulting abrupt traversals of stylus 37, can be avoided by discriminating the momentary balancing of the system during this transient condition.

Figure 1C:
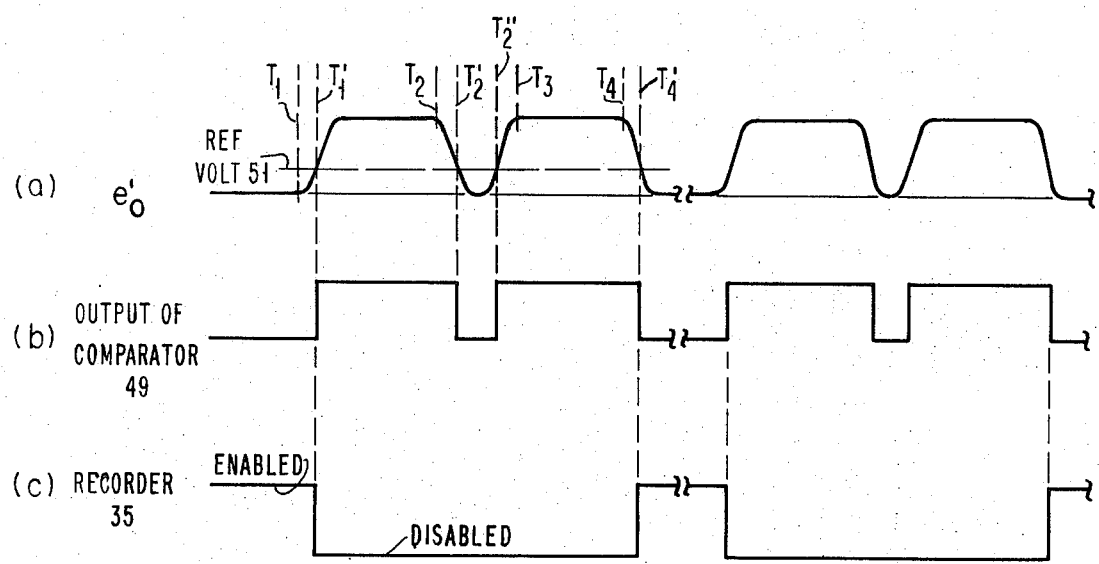

To logically discriminate this transient condition, center electrode 43 is connected to an envelope detector 47, whose output is connected to one input of a comparator circuit 49, the second input of the comparator being connected to a source 51 of reference voltage, which is less than the amplitude $e_0'$ of the output of detector 47, as shown in curve $a$ of FIG. 1C. The output of comparator circuit 49 is connected to the respective inputs of two monostable multivibrator circuits F/F1 and F/F2. Multivibrators F/F1 and F/F2 are operative to be triggered by negatively-going and positively-going inputs, respectively, i.e., the trailing and leading edges, respectively, of the output signal from comparator circuit 49 shown in curve $b$ of FIG. 1C. The respective outputs of multivibrators F/F1 and F/F2 are connected to the inputs of an OR gate 53, whose output is connected to the count input 54 of an up/down counter 55. Counter 55 is adapted to be loaded to a preset count of 4 and operates to provide a carry signal at output 57 when its count passes to zero. The carry output 57 of up/down counter 55 is fed back along lead 59 to set terminal 61, whereby up/down counter 55 is automatically reset.

Also, up/down counter 55 includes a logically coded terminal 63, which is connected along lead 65 to the control input 67 of track/hold circuit 33. Terminal 63 is adapted to be energized while up/down counter 55 is in a full count condition, so as to enable track/hold circuit 33.

As illustrated in FIG. 1C, the operation of track/hold circuit 33 and, hence, recorder 35 is enabled only when passageway 5, i.e., the volume between input and output electrodes 39 and 41, is filled with sample fluid. For example, at the T1, a gas segment G has travelled to input electrode 39, whereby the system becomes unbalanced, i.e., $e_0 \neq 0$. Accordingly, the output signal $e_0'$ of detector 47 increases and, at time T1', exceeds reference voltage 51. At time T1', comparator 49 provides an output pulse, as shown in curve b of FIG. 1C, the leading edge of such pulse triggering multivibrator F/F2 to enable the OR gate 53 and pass a count pulse to count input 54 of up/down counter 55. Accordingly, up/down count 55 counts down to a three-count, so as to de-energize logically coded lead 65 and disable track/hold circuit 35.

As the gas segment G passes downstream of input electrode 39 towards center electrode 43, the system continues unbalanced, since $e_0 \neq 0$, so as to maintain track/hold circuit 35 disabled. At time T2, as gas segment G begins to locate over center electrode 43, signal $e_0'$, as shown in curve a of FIG. 1C, reduces towards zero. Accordingly, when the amplitude of signal $e_0'$ reduces below the reference voltage 51, the output of comparator 49 is reduced, as indicated at T2'. At this time, multivibrator F/F1 triggers on the trailing edge of the comparator output, so as to enable OR gate 53 and provide a second count pulse to count input 54 of up/down counter 55. Accordingly, up/down counter 55 counts down to a two-count, and track/hold circuit 33 continues disabled.

As the gas segment G progresses along passageway 5 beyond center electrode 43, at time T2'', signal $e_0'$ again exceeds reference voltage 51. At this time, comparator 49 is operated, so as to provide an output whose leading edge causes multivibrator F/F2 to trigger and enable OR gate 53 to pass a third count pulse to input 54 of up/down counter 55, so as reduces its state to a one-count, and track/hold circuit 33 continues disabled.

At time T4, when gas segment G passes to output electrode 41 and the volume between input and output electrodes 39 and 41 fills with liquid sample, the system again balances and signal $e_0'$ of detector 47 reduces towards zero. When signal $e_0'$ reduces below the reference voltage 51 at time T4', comparator 49 becomes disabled. Multivibrator F/F1 triggers on the trailing edge of the comparator output, so as to enable OR gate 53 and provide a fourth count pulse to input 54 of up/down counter 55. At time T4', the count of up/down counter is reduced to zero, whereby a carry pulse from terminal 57 is fed back along lead 59 to set terminal 61, so as to preset the counter to a full fourcount. Concurrently, the logically coded lead 65 is energized to enable track/hold circuit 33, so as to track the analytical signal developed across photodetector 29 for recording by recorder 35.

As described, track/hold circuit 33 and the recorder 35 are disabled during such time interval T1'-T4' as a gas segment G is located between input and output electrodes 39 and 41. The presence of each gas segment G between input and output electrodes 39 and 41 and along passageway 5 is indicated by a trace of constant level across the chart in recorder 35, whereas the analytical signals would be recorded therebetween. If preferred, track/hold circuit 35 can be operative to control recorder 35 to identify traces obtained during time interval T1'-T4'.

Figure 2A:
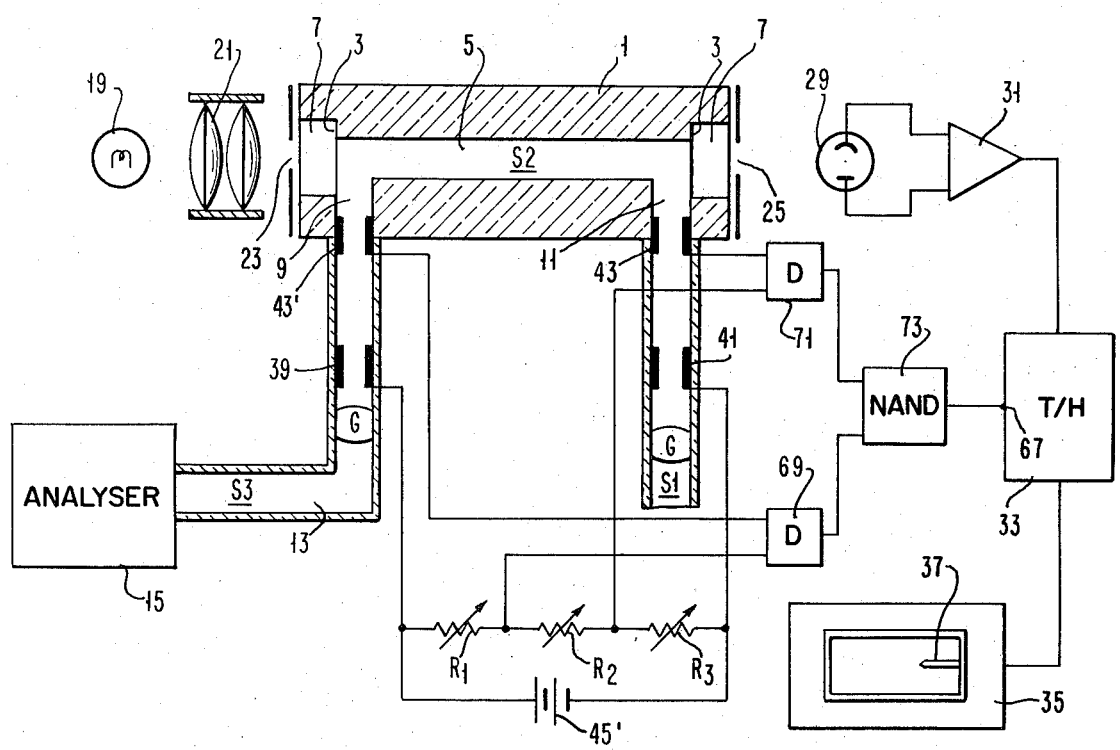
FIG. 2A shows an alternate embodiment of the present invention, comprising a four-electrode flow cell structure.

An additional embodiment is illustrated in FIG. 2A, wherein same references have been used as in FIG. 1A to identify similar structures. The embodiment of FIG. 2A is characterized by the provision of an additional center electrode 43'.

Figure 2B:
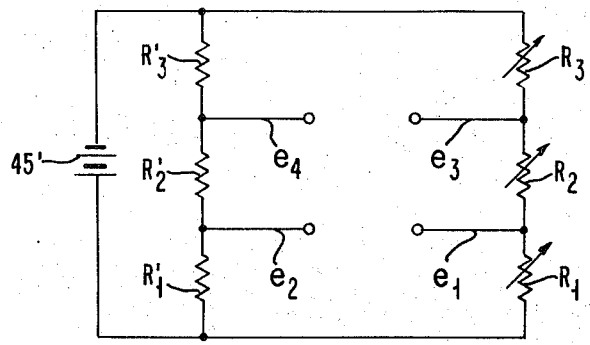
FIG. 2B is a schematic diagram to facilitate an understanding of the operation of FIG. 2A.

As shown, input and output electrodes 39 and 41 are connected across a DC source 45' and in parallel with serially arranged resistors R1, R2 and R3, any or all of which can be variable. The electrode arrangement is schematically depicted in FIG. 2B, wherein $R_1'$, $R_2'$ and $R_3'$ represent the respective resistances of the fluid volumes between input and center electrodes 39 and 43', center electrodes 43' and 43, and center and output electrodes 43 and 41. Again, the arrangement is balanced by adjusting resistors R1, R2 and R3, such that the voltage $e_1$ at the junction of resistors R1 and R2 is equal to the voltage $e_2$ at center electrode 43' and the voltage $e_3$ at the junction of resistors R2 and R3 is equal to the voltage $e_4$ at the center electrode 43, i.e., $e_1=e_2$ and $e_3=e_4$. Again, the spacing S between the electrodes is not critical. The junction of resistors R1 and R2 and center electrode 43' are connected to respective inputs of a differential amplifier 69; also, the junction of resistors R2 and R3 and center electrode 43 are connected to respective inputs of a differential amplifier 71. The respective outputs of differential amplifiers 69 and 71 are connected to the inputs of NAND gate 73, whose output is connected to the control input 67 of the track/hold circuit 33.

In the showing of FIG. 2A, NAND gate 73 is operative to disable track/hold circuit 33 while a gas segment G is located between input and output electrodes 39 and 41; when the volume between input and output electrodes 39 and 41, including passageway 5 is filled only with liquid sample, NAND gate 73 is disabled and track/hold circuit 33 is operative to track the analytical signal developed across photodetector 29 for recording by recorder 35. Passage of a gas segment G between input and output electrodes 39 and 41 results in resistances $R_1'$, $R_2'$, and $R_3'$ each being increased, in turn, so as to unbalance the system, i.e., $e_1 \neq e_2$ and $e_3 \neq e_4$. With respect to each of the center electrodes 43 and 43', however, a transient condition may exist while a gas segment G is critically located along the flow cell structure with respect to such center electrode, such that either of the conditions $e_1=e_2$ or $e_3=e_4$ may occur. However, such conditions, i.e., $e_1 \neq e_2$ and $e_3 \neq e_4$, are exclusive, and do not occur concurrently. Since the volume of the liquid sample is, at least, sufficient to fill the entire volume between input and output electrodes 39 and 41 and since only one gas segment G is located within such volume at any one time, such transient conditions with respect to the center electrodes 43 and 43', respectively, occur sequentially. Hence, while a gas segment G is located between input and output electrodes 39 and 41, one or both of the differential amplifiers 69 and 71 are operative and NAND gate 73 is disabled to inhibit track/hold circuit 33. As in the embodiment of FIG. 1A, the showing of FIG. 2A is operative to record the analytical signal only while a liquid sample S completely fills the passageway 5 of the flow cell structure and to automatically inhibit the recorder 35 while a gas segment G is passing therealong. In this fashion, the operation of the recorder 35 is "gated" so as to record only the analytical signals and avoids major traversals of the stylus member 37 due to an abrupt change or discontinuity in the optical transmission through passageway 5, resulting from the presence of a gas segment G therein.

While preferred embodiments of the invention have been described, it will be apparent that such invention may be embodied in various forms without departing from its principles.

What is claimed is:

1. A system comprising a conduit having a fluid inlet and a fluid outlet for passing a fluid stream, at least three electrodes disposed along said conduit, so as to be each in electrical contact with said fluid stream passing therealong, means interconnecting said electrodes for determining a change in the ratio of the respective conductivities of portions of said stream passing along portions of said conduit system, and control means responsive to said determining means.

2. A flow cell structure comprising: means defining a sight passageway, fluid inlet and fluid outlet means connected to said passageway and defining with said passageway a conduit system, means for passing a fluid stream along said conduit system, said fluid inlet and said fluid outlet means including first and second electrodes, respectively, a third electrode disposed in said conduit system between said first and second electrodes, said first, second and third electrodes adapted to be in electrical contact with said stream, and means for determining a change in the ratio of the respective conductivities of portions of said stream flowing along said conduit system between said first and third electrodes and said third and second electrodes, respectively.

3. A flow cell structure as defined in claim 2, wherein said determining means comprises a bridge-type arrangement.

4. A flow cell structure as defined in claim 2, wherein, at least, said first and second electrodes are tubular electrodes.

5. A flow cell structure as defined in claim 2, wherein selected ones of said first, second and third electrodes are wire electrodes.

6. A flow cell structure as defined in claim 2, wherein said passing means includes means for directing a stream of liquid samples separated one from the other by a segmentizing fluid, said segmentizing fluid and said liquid samples having different conductivities, the volume of each liquid sample being, at least, equal to the volume of the conduit system between said first and second electrodes, whereby only a single segment of said segmentizing fluid is located along said conduit system and between said first and second electrodes at any one time.

7. A flow cell structure as defined in claim 6, comprising means for passing a measuring beam along the axis of said sight passageway, so as to analyze portions of said stream passing therealong, means including a recorder for recording the intensity of said light beam passed along said sight passageway, and means responsive to said determining means for controlling said detector.

8. A flow cell structure as defined in claim 7, wherein said disabling means includes a track/hold circuit.

9. A flow cell structure comprising sight passageway means and fluid inlet means and fluid outlet means defining a conduit system, means for passing a fluid stream along said conduit system, means for analyzing said stream passing along said passageway means, first, second, third and fourth electrode means in electrical contact with said stream flowing along a portion of said conduit system, and means interconnecting said first, second, third and fourth electrode means for indicating a change in the conductivity of said stream passing along said portion of said conductivity system.

10. A flow cell structure as defined in claim 9 wherein, said indicating means includes first means for indicating a change in the ratio of the respective conductivities of portions of said liquid stream passing between said first and third electrode means and said third and second electrode means and, also, second means for indicating a change in the ratio of the respective conductivities of portions of such stream passing between said first and fourth electrodes and said fourth and second electrodes, respectively.

11. A flow cell structure as defined in claim 10 including control means responsive to said first and second means upon a change in either of said ratios.

* * * * *